Dec. 31, 1946.  J. H. HAMMOND, JR  2,413,621
RADIO CONTROLLED ROCKET
Filed March 22, 1944  3 Sheets-Sheet 1

INVENTOR
JOHN HAYS HAMMOND, JR.
BY
ATTORNEY

Dec. 31, 1946.　　J. H. HAMMOND, JR　　2,413,621
RADIO CONTROLLED ROCKET
Filed March 22, 1944　　3 Sheets-Sheet 2

INVENTOR
JOHN HAYS HAMMOND, JR.
BY
ATTORNEY

Dec. 31, 1946.　　　J. H. HAMMOND, JR　　　2,413,621
RADIO CONTROLLED ROCKET
Filed March 22, 1944　　　3 Sheets-Sheet 3

INVENTOR
JOHN HAYS HAMMOND, JR.
BY
ATTORNEY

Patented Dec. 31, 1946

2,413,621

UNITED STATES PATENT OFFICE 2,413,621

RADIO CONTROLLED ROCKET

John Hays Hammond, Jr., Gloucester, Mass., assignor to Radio Corporation of America, New York, N. Y., a corporation of Delaware Application March 22, 1944, Serial No. 527,536

6 Claims. (Cl. 102—50)

1

The invention relates to the radio-dynamic control of rockets and more particularly to a radio control system which can selectively steer the rocket in any one of a plurality of directions.

The invention provides means for controlling the path of flight of a rocket in connection with gyroscopic or other stabilizing means in which the rocket may be caused to travel on a definite course under gyroscopic control, this course, however, being capable of being changed by means of radio control.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a longitudinal section of the forward portion of a rocket embodying the present invention.

Like reference characters denote like parts in the several figures of the drawings.

In the following description parts will be identified by specific names for convenience, but they are intended to be as generic in their application to similar parts as the art will permit.

Figures 1, 2:
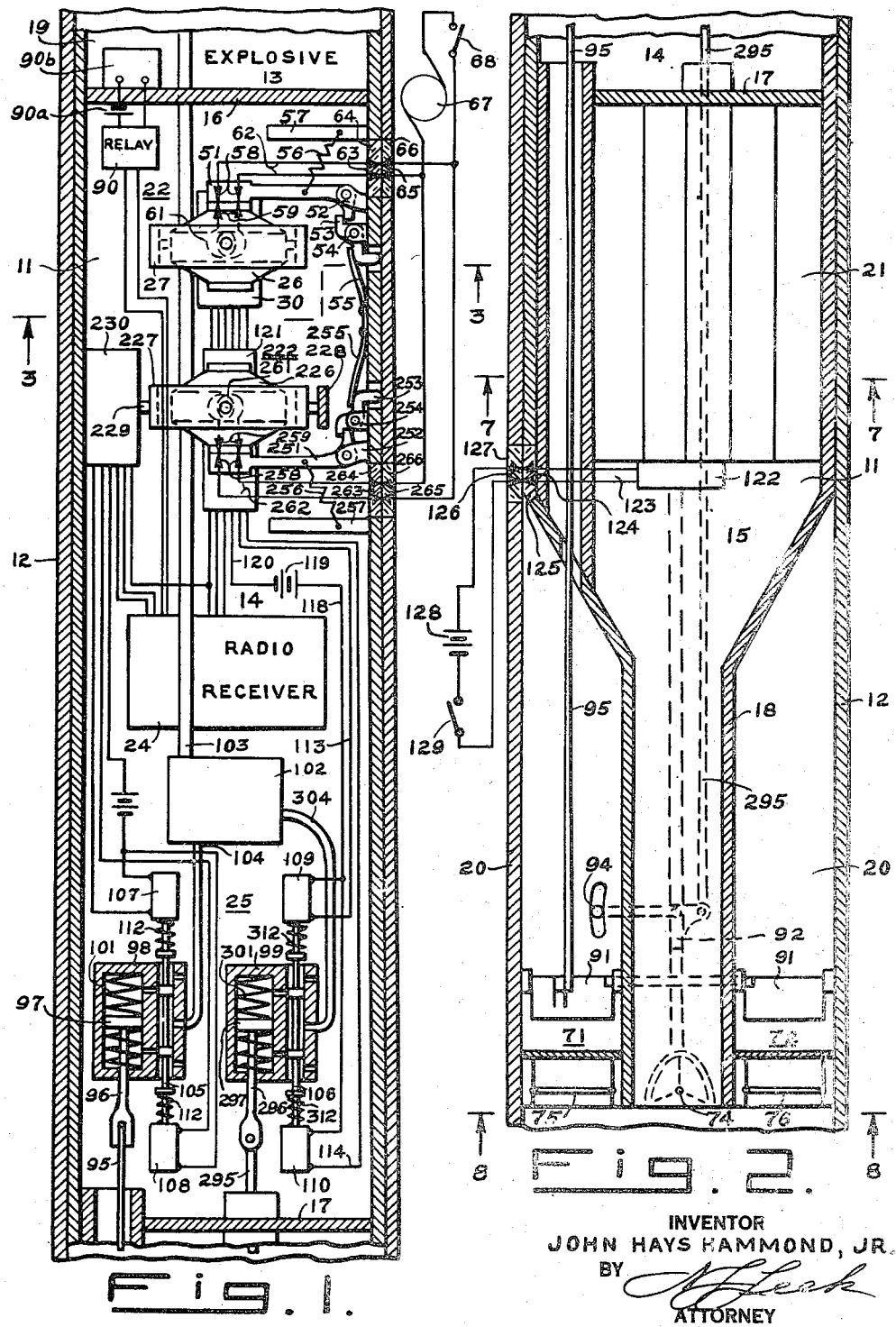
Fig. 2 is a longitudinal section of the after portion of the rocket.

Referring to the accompanying drawings and more particularly to Figs. 1 and 2 a rocket 11 is shown as resting in a firing tube 12 which may be mounted in any suitable manner, not shown, for projecting the rocket 11 in any desired direction. The rocket 11 is divided into explosive, control, and propulsion compartments 13, 14 and 15 respectively by two transverse partitions 16

2 and 17. The propulsion compartment 15 (Fig. 2) is connected at its lower end to a discharge tube 18. Mounted on the discharge tube 18 are fins 20. The explosive compartment 13 is filled with a high explosive 19 and the propulsion compartment 15 is filled with sticks of slow burning powder 21 or other suitable material for rocket propulsion.

In the control compartment 14 are located two gyroscopes 22 and 222, a radio receiver 24 and a rudder operating mechanism 25. The gyroscope 22 comprises a rotor (not shown) mounted for rotation in a rotor casing 26 (see Fig. 3) which is pivoted in a gimbal ring 27. The gimbal ring 27 is pivoted in a cross member 28 and is provided with a shaft 29 which is rotatably mounted in a control box 30. To the end of the shaft 29 (see Figs. 4 and 5) is attached a contact arm 32 which co-operates with two semi-circular conducting segments 33 and 34 which are mounted on but insulated from a disc 35. The disc 35 is rotatably mounted in line with the shaft 29 and is provided with two sets of ratchet teeth 36 and 37 and a set of detent teeth 38.

Mounted in the control box 30 are two solenoids 41 and 41a which are provided with cores 43 and 43a which reciprocate in brackets 44 and 44a respectively. The cores 43 and 43a are provided with shoulders 45, 45a and 46, 46a, respectively, the latter normally engaging the brackets 44, 44a. Between the shoulders 45, 45a and the solenoids are mounted compression springs 47, 47a. Pivotally mounted on the cores 43, 43a are pawls 48, 48a against which press flat springs 49, 49a. The pawls 48 and 48a cooperate with the ratchets 36 and 37, respectively, but are normally held out of engagement with these ratchets. A detent 40 is secured to the end of a flat spring 50 and engages the teeth 38.

The gyroscope 222 is similar to the gyroscope 22 and is provided with a shaft 229 rotatably mounted in a control box 230. The corresponding parts have been given the same reference characters as those described above but with the numerals increased by 200.

In order to hold the gyroscopes 22 and 222 in fixed positions until the rocket 11 is ready to be fired L shaped arms 51 and 251 are provided which are pivoted to brackets 52 and 252 secured to the shell of the rocket 11. Engaging the small ends of the arms 51 and 251 are Z-shaped members 53 and 253 which are pivoted in brackets 54 and 254. Flat springs 55 and 255 tend to hold one end of the respective members 53 and 253 against the inside surface of the tube 12.

Tension springs 56 and 256 are connected to the arms 51 and 251 and to brackets 57 and 257 and tend to pull the arms 51 and 251 respectively away from the gyro casings 26 and 226. The outer ends of brackets 57 and 257 engage the casings 26 and 226. The inner ends of the arms 51 and 251 are provided with contacts 58 and 258 which engage contacts 59 and 259 connected to the windings 61 and 261 respectively of the gyro rotors. The contacts 58 and 258 are connected by flexible conductors 62 and 262 to contacts 63 and 263 respectively which are mounted in blocks of insulation 64 and 264 in the shell of the rocket 11. The contacts 63 and 263 normally engage contacts 65 and 265 respectively mounted in blocks of insulation 66 and 266 in the tube 12. The contacts 65 and 265 are connected in parallel across a source of electrical energy 67 through a switch 68.

Figure 3:
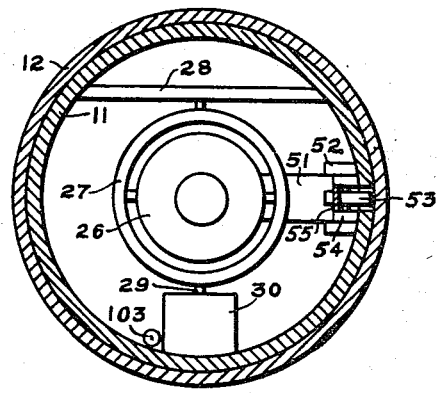
Fig. 3 is a section taken on line 3—3 of Fig. 1.
Figure 6:
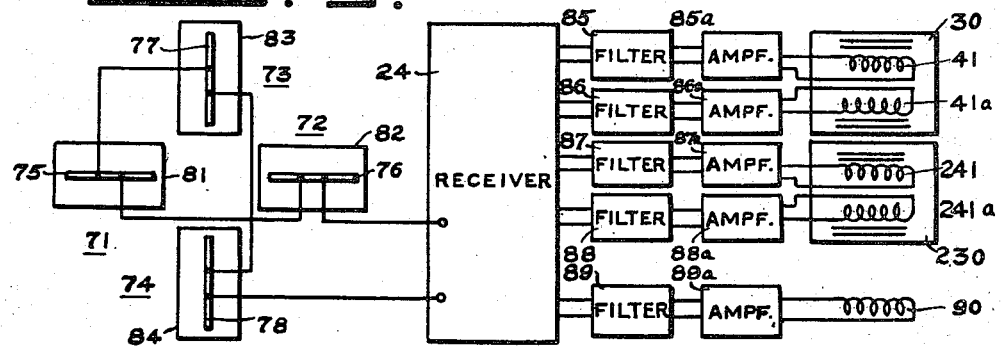
Fig. 6 illustrates diagrammatically the receiving circuits located on the rocket.
Figure 7:
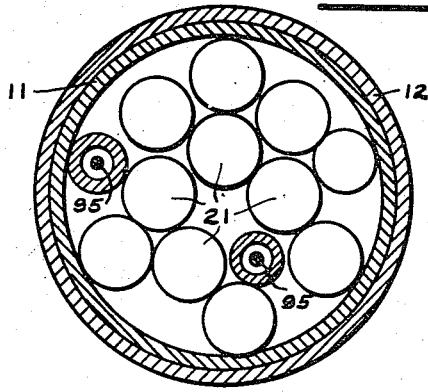
Fig. 7 is a section taken on line 7—7 of Fig. 2.
Figure 8:
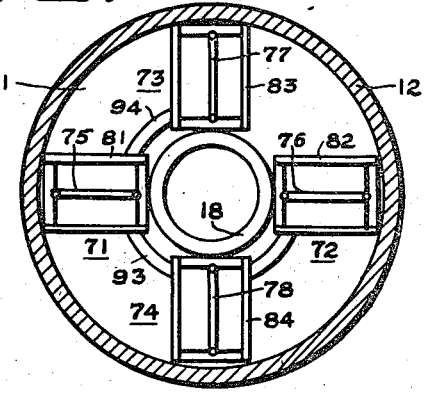
Fig. 8 is a section taken on line 8—8 of Fig. 2.

Fig. 6 is a diagrammatic illustration of the receiver 24 which may be similar in design to the receiver depicted in Fig. 3 of my co-pending application 458,938 and is connected to a directional antenna system 71—72, 73—74 which is mounted at the tail of the rocket 11 (see Fig. 8). The axes of the antennas 71—72 and 73—74 are located in planes at right angles to each other and preferably in the planes of the vanes 20.

The antennas are shown as comprising wave receiving members 75—76 and 77—78 and directional members 81—82 and 83—84. The directional members are suited to make the receiving elements receptive to signals received from the rear and to shield the receiving members from waves propagated from other directions, so that possibility of interference with the control beam is eliminated.

The receiver 24 is connected thru five filters 85—89 to the input circuits of five amplifiers 85a—89a the output circuits of which are connected to the solenoids 41 and 41a in control box 30, the solenoids 241 and 241a in the control box 230, and to a relay 90 respectively. The contacts of the relay 90 are connected thru a battery 90a (Fig. 1) to a detonator 90b which is located in the explosive charge 19 in the explosive compartment 13.

The rudder operating mechanism 25 controls two sets of rudders 91 and 92 pivotally mounted in the vanes 20. The two rudders 91 are connected together by a curved rod 93 and the two rudders 92 are connected together by a curved rod 94.

The two sets of rudders 91 and 92 are connected by links 95 and 295 respectively to piston rods 96 and 296, attached to pistons 97 and 297 which reciprocate in cylinders 98 and 99. Balanced compression springs 101 and 301 are provided for normally holding the pistons 97 and 297 respectively and therefore the rudders 91 and 92, in a central position.

The pistons 97 and 297 are actuated by air under pressure which is supplied from a tank 102. This tank is shown as being connected by a pipe 103 to a funnel shaped opening in the nose of the rocket 11. A flask containing air under pressure may also be used as a source of compressed air if desired. The tank 102 is connected to the cylinders 98 and 99 by means of conduits 104 and 304 and the supply of air to the interior of the cylinders 98 and 99 is controlled by two piston valves 105 and 106 respectively. The valve 105 is operated in opposite directions by means of two solenoids 107 and 108 and the valve 106 is operated in opposite directions by means of two solenoids 109 and 110. Balanced compression springs 112 and 312 are provided to maintain the valves 105 and 106 in a central position when the solenoids 107—110 are de-energized.

The windings of the solenoids 109 and 110 are connected by conductors 113 and 114 to two brushes 115 and 116 which are mounted on a block of insulation 117 in the control box 30 and which make contact with the contact segments 33 and 34 respectively. The return leads of the windings of the solenoids 109 and 110 are connected by a conductor 118 to a battery 119 which is connected by a conductor 120 to the contact arm 32. The solenoids 107 and 108 are connected in a similar manner to brushes 115a and 116a in control box 230. The conductors 113, 114 and 120 together with the conductors from the radio receiver 24 to control box 30, pass thru a protective sleeve 121 under the gyroscope 222.

For igniting the propulsion powder sticks 21 an igniter 122 is provided which is mounted adjacent to the powder sticks 21 and is connected by two conductors 123 to two contacts 124 mounted in a block of insulation 125. The contacts 124 engage contacts 126 which are mounted in a block of insulation 127 and which are connected in series with a battery 128 and a switch 129.

Figure 9:
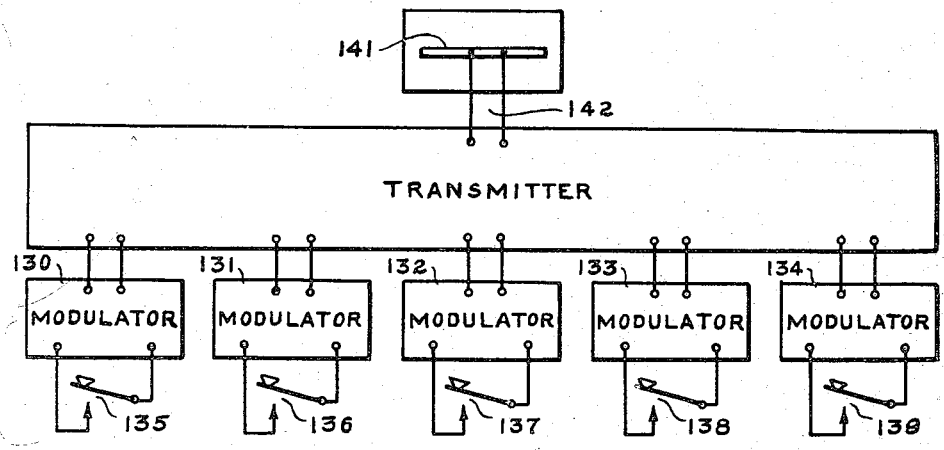
Fig. 9 is a block diagram of the transmitter.

Fig. 9 is a diagrammatic illustration of the transmitter which may be similar in design to the transmitter depicted in Fig. 2 of my copending application, Serial Number 458,938. The transmitter is of a type to generate a short wave carrier modulated by a control frequency. Five modulators 130—134 are connected to vary the control frequency when individually operated to produce the "A," "B," "C," "D" and "E" control frequencies respectively. The modulators 130—134 are controlled by five keys 135—139. The transmitter is connected to the antenna 141 by means of the line 142.

*Operation*

A few minutes before it is desired to fire the rocket 11 the switch 68 is closed which closes a circuit from the generator 67 thru the contacts 65 and 63, conductors 62, contacts 58 and 59 to the windings 61 of the gyroscopes 22 and 222. This causes the rotating elements of the gyroscopes 22 and 222 to be brought up and maintained at speed. The gyroscopes 22 and 222 are held in the positions shown by means of the arms 51 and 251.

When it is desired to fire the rocket 11 the switch 129 is closed thus completing a circuit from the battery 128 to the igniter 122 which ignites the powder sticks 21. As these commence to burn the products of combustion will be forced out of the discharge tube 18 and will cause the rocket 11 to be propelled out of the tube 12. As the rocket 11 leaves the tube 12 the supply of power to the gyroscopes 22 and 222 will be cut off, but their rotors will continue to rotate for a long period of time due to their momentum. As the rocket 11 leaves the tube 12 the members 53 and 253 will no longer press against the inside of the tube 12 but will be free to rotate slightly under the action of the springs 55 and 255 thus releasing the arms 51 and 251 which, under the action of the springs 56 and 256 will be moved away from the gyroscopes 22 and 222, thus leaving them free to turn in the rocket.

As long as the rocket 11 travels in the direction in which it was headed the contact arms 32 and 232 in the control boxes 30 and 230 will remain on the insulation between the segments 33—34 and 233—234 and all the solenoids 107—110 will remain de-energized and the rudders 91 and 92 will remain centered.

Figure 4:
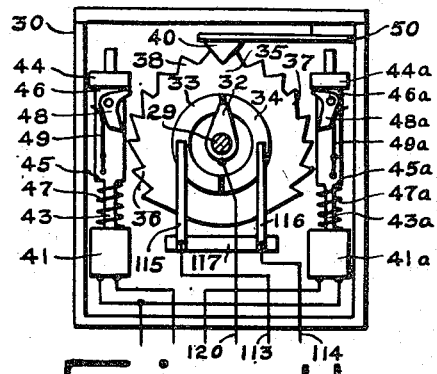
Fig. 4 is an enlarged view of the control box.
Figure 5:
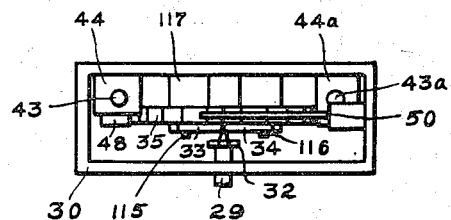
Fig. 5 is a plan view of the control box.

If the rocket 11 should deviate to the right as seen in Figs. 1 and 4 the gyroscope 22 would remain fixed in space and the disc 35 would be rotated with the rocket in a clockwise direction relative thereto. This would cause the arm 32 to engage the segment 33 which would close a circuit from the battery 119, conductor 120, arm 32, segment 33, brush 115, conductor 113, solenoid 109, and conductor 118 back to the battery 119. This will cause the energization of the solenoid 109 which in turn will cause the piston valve 106 to move upward which will allow air under pressure to pass from the tank 102 thru pipe 104 to the upper end of the cylinder 99. This will cause the piston 97 in this cylinder to move downward which by means of the piston rod 96 and link 95 will cause the rudders 92 to be moved in a clockwise direction to steer the rocket 11 to the left. The rocket will continue to turn to the left until it is again on its original course at which time the insulation between the segments 33 and 34 will have moved under the arm 32 and the circuit to the solenoid 109 will be broken, thus allowing the piston valve 106 to be returned to a central position under the action of the springs 112. The piston 97 together with the rudders 92 will then be returned to a central position under the action of the springs 101.

If the rocket 11 deviates to the left or up or down a similar action will take place energizing the solenoids 110, 107 or 108, respectively. It is thus seen that in this way the rocket is maintained on a predetermined straight course which is a prolongation of the direction in which it was headed when it was fired.

If it is desired to deflect the rocket 11 from its course, the radio control mechanism is operated under the control of the transmitter shown in Fig. 9 which may be located on the ground adjacent to the firing tube 12 or at any other suitable location as on an airplane which may control the direction of the rocket from the air.

In the operation of the transmitter of Fig. 9 a radio frequency is generated which is modulated by the "A," "B," "C" and "D" or "E" control frequency when any one of the keys 130, 131, 132, 133 or 134 is depressed. In this way when any one of the keys 130—134 is depressed a plane polarized wave is radiated from the antenna 141, this wave being modulated at a different predetermined frequency for each key.

The modulated radio wave transmitted from the antenna 134 is received by the antenna system 71—74 of the rocket 11 and selectively operates the amplifiers 85a—89a. The amplifiers 85a—89a will in turn energize the solenoids 41—41a of control box 30, the solenoids 241, 241a of control box 230, or the relay 90 respectively.

If, for example, it is desired to deflect the rocket 11 to the left, as seen in Fig. 1, the key 136 of the transmitter is depressed which causes the "B" frequency to be transmitted. The radiated wave is picked up by the receiving antenna 71—74 on the rocket 11 and actuates the amplifier 86a. This amplifier is connected to the solenoid 41a in control box 30 where is thereby energized. The energization of the solenoid 41a causes the core 43a to be moved downward which allows the pawl 48a to engage one of the teeth 37. As the core 43a continues to move downward the disc 35 will be rotated in a clockwise direction until the detent 40 has dropped into the next tooth 38.

The rotation of the disc 35 will carry with it the segments 33 and 34 so that the arm 32 will engage the segment 33. This, as previously described will cause the energization of the solenoid 109 which in turn will cause the rudders 92 to be deflected to the left to steer the rocket 11 to the left. This deflecting movement will continue until the rocket 11 has been deflected sufficiently to the left to cause the insulation between the segments 33 and 34 to move under the arm 32. At this time the rocket 11 will again assume a straight course and will continue to travel on the same until another radio impulse is sent.

If it is desired to deflect the rocket 11 to the right the key 135 of the transmitter is depressed causing the "A" frequency to be transmitted. This as already described actuates the amplifier 85a and energizes the solenoid 41 in control box 30. The energization of this solenoid causes the rotation of the disc 35 one step in a counterclockwise direction, which in a manner similar to that already described, causes the energization of the solenoid 110 which, in turn deflects the rudder 92 to the right and steers the rocket 11 to the right.

In a similar manner the depressing of the keys 137 or 138 of the transmitter will cause the rocket 11 to be deflected either down or up thru a given angle. If it is desired to deflect the rocket 11 further in any given direction a second or third impulse of the required type is sent and the disc 35 will be rotated two or three steps as desired.

It is thus seen that a system is provided which will normally maintain the rocket on a straight course. By sending suitable impulses the rocket may be deflected thru predetermined angles in any one of four directions at right angles to each other. After being so deflected the rocket will maintain the new course until further impulses are sent to deflect it in a different direction.

If it is desired to explode the rocket when it reaches the vicinity of the target the key 139 at the transmitter is depressed causing the "E" frequency to be transmitted. This is received by the antenna system 74 and receiver 24 and operates the amplifier 89e which in turn causes the energization of the relay 90. This will close a circuit from the battery 90a to the detonator 90b which will cause the detonation of the explosive charge 19.

Figure 10:
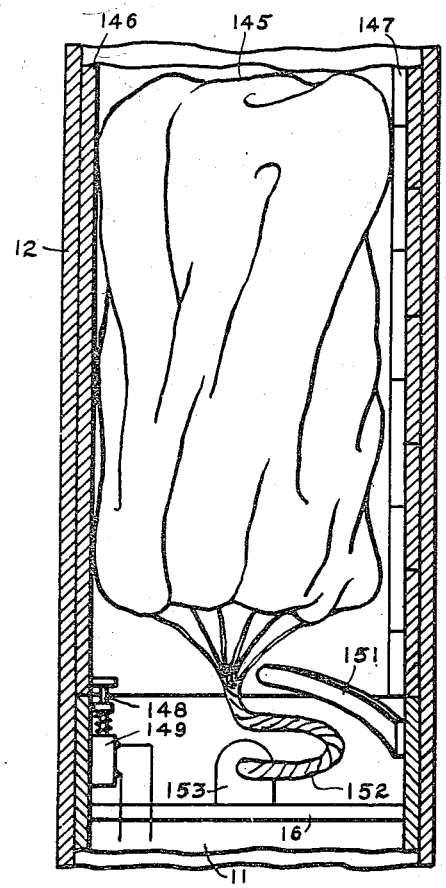
Fig. 10 is a longitudinal section of the forward portion of the rocket showing a modified form of the invention.

A modification of the invention is shown in Fig. 10 in which the explosive charge 19 is replaced by a parachute 145, so that when the rocket is used for experimental purposes it may be recovered undamaged.

In this modified form of the invention a portion of the shell of the rocket 11 is formed with a door 146 which is hinged at 147. A locking mechanism 148 is provided which is operated by a solenoid 149 which takes the place of the detonator 90b, shown in Fig. 1, and is controlled by the relay 90. A spring 151 is secured to the inside of the casing of the rocket 11 and presses against the door 146 tending to force it open. The parachute 145 is attached to one end of a cord 152 the other end of which is secured to a lug 153 attached to the bulkhead 16.

*Operation of Fig. 9*

At the end of an experimental flight when the velocity of the rocket is nearly zero the "E" frequency is transmitted and, as previously described, causes the operation of the relay 90 which in turn causes the energization of the solenoid 149 which releases the locking mechanism 148. This causes the door 146 to be opened under the action of the spring 151 and allows the parachute 145 to drop out and bring the rocket unharmed to earth.

Although only a few of the various forms in which this invention may be embodied have been shown herein, it is to be understood that the invention is not limited to any specific construction but may be embodied in various forms without departing from the spirit of the invention as defined by the appended claims.

What is claimed is:

1. In a rocket, jet propulsion means, sets of crossed rudders for steering in four directions, steering mechanism including a pair of stable members mounted respectively for freedom of movement about the two axes of said rudders, control elements actuated by the respective stable members and connected to control the respective rudders to maintain a given course, means to shift each control element relative to said stable member for changing the course, and means responsive to received radiant energy pulses for actuating said shifting means.

2. In a rocket, jet propulsion means, sets of crossed rudders for steering in four directions, steering mechanism including a pair of stable members mounted respectively for freedom of movement about the two axes of said rudders, control elements actuated by the respective stable members and connected to control the respective rudders to maintain a given course, reversible step-by-step means to shift each control element relative to said stable member for changing the course, a radio receiver receptive to radiant energy pulses, selective means to segregate pulses of predetermined characteristics, and relay means responsive to selected pulses to actuate said step-by-step means.

3. In a rocket, jet propulsion means, sets of crossed rudders for steering in four directions, steering mechanism including a pair of stable members mounted respectively for freedom of movement about the two axes of said rudders, control elements actuated by the respective stable members and connected to control the respective rudders to maintain a given course, a radio receiver having circuits selective to control signals of different characteristics, relay means connected to said circuits to be actuated by the respective signals and step-by-step mechanism actuated by each relay to shift said control element for steering the rocket in a given direction.

4. In a rocket, jet propulsion means, sets of crossed rudders for steering the rocket in four directions, a directive radio antenna in alignment with each rudder and directionally receptive to radiant energy received from the rear only, a radio receiver in said rocket connected to be energized by the received energy and including circuits selective of different control signals, rudder control means connected to be actuated by said selected signals for steering said rocket, a detonator and additional means connected to be actuated by selected signals to actuate said detonator.

5. In a rocket, jet propulsion means, sets of crossed rudders for steering the rocket in four directions, a directive radio antenna in alignment with each rudder and directionally receptive to radiant energy received from the rear only, a radio receiver in said rocket connected to be energized by the received energy and including circuits selective of different control signals, rudder control means connected to be actuated by said selected signals for steering said rocket, a releasable parachute in said rocket, release mechanism therefore and additional means connected to be actuated by selected signals to actuate said release means.

6. In a rocket, jet propulsion means, steering rudders, steering control mechanism connected to actuate said rudders, a gyroscope, a control member on said rocket actuated by movement relative to said gyroscope to actuate said steering control mechanism so as to maintain a predetermined course, means locking said gyroscope in a given position, and means responsive to launching of said rocket to release said locking means.

JOHN HAYS HAMMOND, Jr.